(12) United States Patent
Ericson

(10) Patent No.: US 7,699,145 B2
(45) Date of Patent: Apr. 20, 2010

(54) ELEVATOR DISK BRAKE WITH DAMPING

(75) Inventor: Richard J. Ericson, Southington, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 11/718,267

(22) PCT Filed: Nov. 1, 2004

(86) PCT No.: PCT/US2004/036182

§ 371 (c)(1),
(2), (4) Date: Apr. 30, 2007

(87) PCT Pub. No.: WO2006/049612

PCT Pub. Date: May 11, 2006

(65) Prior Publication Data

US 2008/0156590 A1     Jul. 3, 2008

(51) Int. Cl.
*F16D 55/02* (2006.01)
(52) U.S. Cl. .................................... 188/171; 187/250
(58) Field of Classification Search .............. 188/171, 188/173; 187/250, 254, 359; 310/77
See application file for complete search history.

(56) References Cited

U.S. PATENT DOCUMENTS

| | | | |
|---|---|---|---|
| 2,117,433 A * | 5/1938 | Krebs | 123/90.66 |
| 3,268,199 A * | 8/1966 | Kordyban et al. | 220/632 |
| 4,346,791 A * | 8/1982 | Cumming | 188/71.5 |
| 4,391,354 A | 7/1983 | Bucksch | |
| 5,145,035 A | 9/1992 | Garrido et al. | |
| 5,186,284 A * | 2/1993 | Lamela et al. | 188/71.8 |
| 5,199,532 A | 4/1993 | Suganuma et al. | |
| 5,253,738 A | 10/1993 | Vertesy et al. | |
| 5,631,510 A | 5/1997 | Flaig et al. | |
| 5,669,469 A | 9/1997 | Ericson et al. | |
| 5,739,610 A | 4/1998 | Nemoto et al. | |
| 6,675,939 B2 | 1/2004 | Maurice et al. | |
| 2001/0052440 A1 | 12/2001 | Rinmann et al. | |
| 2002/0003070 A1 | 1/2002 | Mustalahti et al. | |
| 2002/0100646 A1 | 8/2002 | Maurice et al. | |

FOREIGN PATENT DOCUMENTS

EP            0009180          6/1982

(Continued)

OTHER PUBLICATIONS

International Search Report dated Aug. 4, 2005.

(Continued)

*Primary Examiner*—Christopher P Schwartz
(74) *Attorney, Agent, or Firm*—Carlson, Gaskey & Olds

(57) ABSTRACT

An elevator brake assembly (16) includes a plate (26) having damper assemblies (28) including at least one spring (30) for controlling movement of the plate (26) relative to a magnetic field generator (20). A biasing member (36) forces the plate (26) into engagement with a disk (22) fixed to a rotating shaft (18). A force created by the magnetic field generator (20) overcomes force of the biasing member (32) to draw the plate (26) into contact with the magnetic field generator (20). The impact between the plate (26) and the magnetic field generator (20) is controlled by the damping assembly (28) to substantially reduce impact noise.

19 Claims, 3 Drawing Sheets

FOREIGN PATENT DOCUMENTS

| | | |
|---|---|---|
| EP | 0736477 | 10/1996 |
| EP | 1423626 | 6/2004 |
| EP | 1557392 | 7/2005 |
| JP | 8-73143 | 3/1996 |
| JP | 08073143 | 3/1996 |

OTHER PUBLICATIONS

International Preliminary Report on Patentability mailed May 3, 2007.

* cited by examiner though this air gap
ELEVATOR DISK BRAKE WITH DAMPING

FIELD OF THE INVENTION

This invention generally relates to elevator systems. More particularly, this invention relates to a braking assembly for an elevator system including a damper for reducing sound generation.

DESCRIPTION OF THE RELATED ART

Conventional elevator systems include a motor for moving an elevator car within a hoistway and a brake assembly for holding the elevator car in a desired position. A conventional brake assembly includes a disk mounted for rotation with a shaft driven by the motor. The disk includes friction material on each side. A plate is biased into braking engagement with the disk such that the brake is normally applied. The disk is fabricated from a non-magnetic material and the plate is constructed of a magnetic material. An applied magnetic field selectively causes disengagement of the plate and the disk, which allows movement of the elevator car. The generated magnetic field draws the plate away from the disk and into contact with a brake coil housing.

The plate typically moves through an air gap of approximately 0.3 mm. The movement of the plate though this air gap can result in objectionable noise that can be heard within the elevator car. Magnetic fields tend to increase in proportion to the square of the distance to the magnet housing, tending to create an acceleration of the brake movable plates on lifting that can make objectionable noises.

On brake dropping, if the magnetic field decays too quickly, then the movable plates are accelerated by the springs in the brake housing also generating noise. The brake noise can somewhat be reduced by using a diode circuit to delay the collapse of the magnetic field when the brake drops, but this is not always successful.

Current attempts and prior art to reduce the noise generated by contact between the plate and the field generator include the use of elastomeric damping elements, such as O-rings. The O-rings dampen movement to reduce the impact, thereby reducing the level of noise generated. Disadvantageously, the O-rings are subject to creep, stress relaxation and aging. Over time these factors degrade the O-ring causing a noticeable increase in noise. The increase in noise ultimately requires that the O-rings be replaced in order to maintain the desired noise dampening characteristics. Further, other known devices include the use of an elastomeric bumper or pad. Such devices also suffer from the limited life span associated with the O-rings.

It is desirable to develop a dampening device fox reducing noise that has a substantially increased service life.

SUMMARY OF THE INVENTION

An exemplary disclosed elevator brake assembly includes a plate having a damper assembly including at least one spring for controlling movement of the plate relative to a field generator.

One example brake assembly includes a biasing member that forces the plate into engagement with a disk for applying a braking force. A magnetic field generator creates a magnetic force for disengaging the plate from the disk. The force created by the field generator overcomes forces exerted by the biasing member to draw the plate toward the field generator. The movement of the plate towards the field generator is controlled by the damping assembly to reduce noise. An example damping assembly includes at least one spring that biases a plunger into engagement with the magnetic field generator. The example damping assembly reduces sound generation and provides increased durability and service life.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
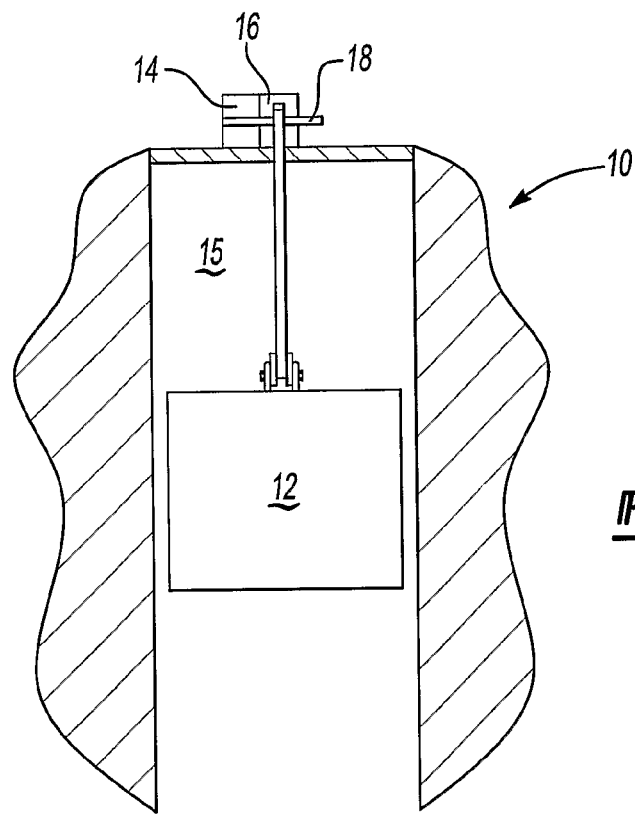
FIG. 1, is a schematic view of an elevator system.

Referring to FIG. 1, an elevator system 10 includes an elevator car 12 movable within a hoistway 15. A motor 14 drives a shaft 18 that in turn moves the elevator car 12. A brake assembly 16 is normally engaged to hold the elevator car 12 in a desired position. The motor 14 and brake assembly 16 are shown schematically and can be mounted either within the hoistway 15 or within a separate machine room.

Figure 2:
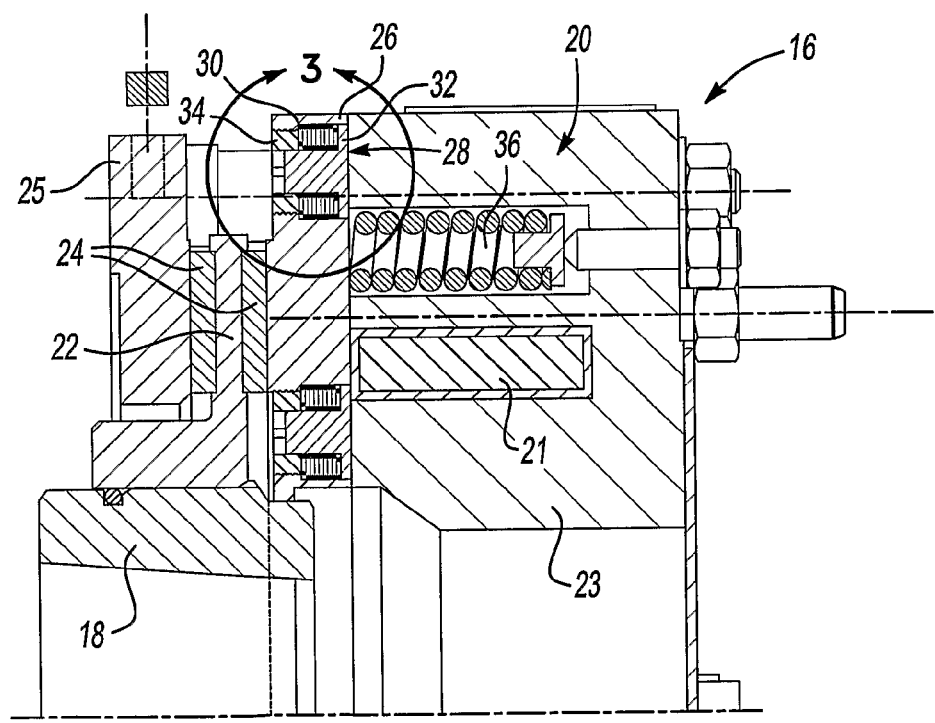
FIG. 2 is a cross-section of an example brake assembly according to an embodiment of this invention.

Referring to FIG. 2, the brake assembly 16 includes a magnetic field generator 20, a disk 22 rotatable with the shaft 18 and a plate 26. The disk 22 includes pads of known friction material 24. The disk 22 is constructed of non-magnetic material, and the plate 26 is constructed of a magnetic material. It is also possible for the brake assembly to use a plurality of two or more disks 22 in order to increase the brake torque capacity in a small envelope.

The example magnetic field generator 20 includes a coil 21 disposed within a housing 23. A biasing member 36 is also disposed within the housing 23 and biases the plate 26 into braking contact with the disk 22. The disk 22 includes friction material 24 on each side. The disk 22 is movable axially along the shaft 18 such that the biasing member 36 drives the plate 26 into the disk 22 that in turn is driven against a fixed housing portion 25. The disk 22 is thereby clamped between the plate 26 and the fixed housing portion 25 in the default, normally engaged position.

Energizing the coil 21 generates a magnetic field that attracts the plate 26. The magnetic field force overcomes the force of the biasing member 36 to draw the plate 26 toward and eventually against the housing 23. The example biasing member 36 exerts considerable force to brake the disk(s) 22 and prevent movement of the elevator car 12. The force generated by the magnetic field generator 20 creates a correspondingly large magnetic force that overcomes the force of the biasing member 36. The attraction of the plate 26 toward the housing 23 increases as the plate 26 moves toward the housing 23. The increasing force on the plate 26 causes an impact with the housing 23. This impact between the plate 26 and the housing 23 results in noise.

The example plate 26 includes a plurality of damper assemblies 28 for controlling the magnitude of the impact between the plate 26 and the housing 23. Each of the illustrated damper assemblies 28 includes a plurality of bevel Belleville washer springs 30. The bevel Belleville washer springs 30 bias a plunger 32 against the housing 23. Although bevel Belleville washer springs 30 are preferred, a worker skilled in the art with the benefit of this disclosure would understand that other springs may suit particular needs. For example other spring shapes are possible, such as wavy springs, "w" cross-section springs, or cantilever beam springs, having an equivalent stroke and effective spring rate, and theoretical infinite fatigue life.

Figure 3:
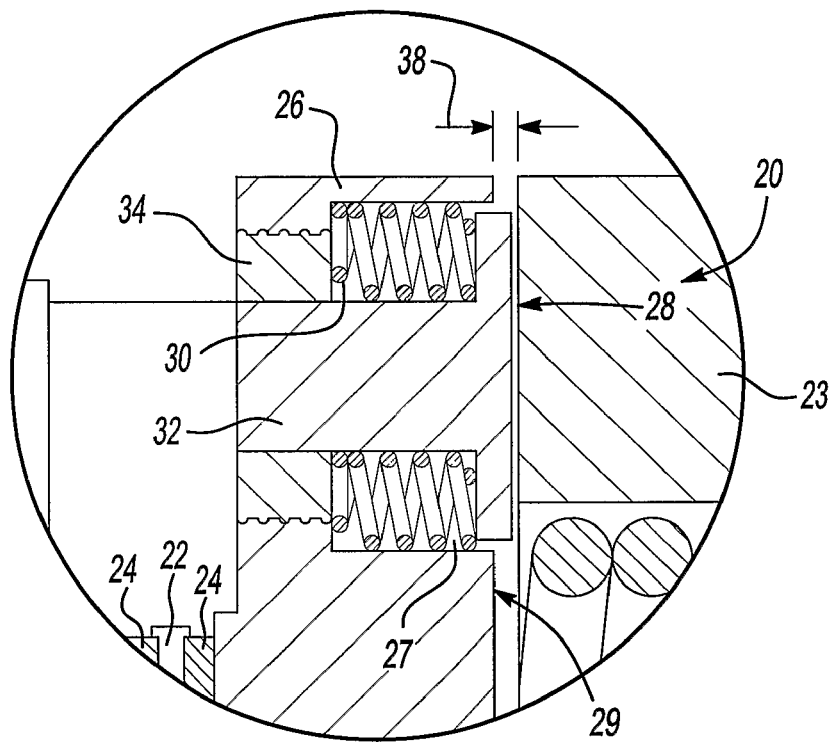
FIG. 3 is an enlarged view of the portion encircled in FIG. 2.

Referring to FIG. 3, the plate 26 defines a cavity 27 for each damper assembly 28. The bevel washer springs 30 and plunger 32 are assembled into each cavity 27 such that only a portion of the plunger 32 extends beyond a face 29 of the plate 26. The example cavity 27 includes a threaded plug 34 near an end of the cavity 27.

The threaded plug 34 includes threads that correspond to threads formed within the plate 26. The threaded plug 34 provides for adjustment of the biasing force exerted by each damper assembly 28. Rotating the threaded plug 34 such that the threaded plug moves inwardly to reduce a depth of the cavity 27 increases a preload compression on the Belleville bevel washer springs 30 resulting in an increases in force exerted on the plunger 32. Alternatively, rotating the threaded plug 34 outwardly increases the depth of the cavity 27, decreasing a preload compression on the bevel washer springs 30 to decrease the force exerted on the plunger 32.

Each damper assembly 28 exerts a biasing force in a direction opposing the force of the magnetic field. The magnitude of the biasing force exerted by the damper assemblies 28 is tailored to ease the impact of the plate 26 against the housing 23. The force exerted by the biasing member 36 combined with the damper assemblies 28 is of a magnitude less than that of the force of the magnetic field.

However, the force of the magnetic field changes proportionally responsive to the distance from the housing 23. The magnetic force exerted on the plate 26 increases as the plate 26 moves closer to the housing 23. The example damper assemblies 28 provide additional biasing forces tailored to limit the magnitude of impact between the plate 26 and housing 23 and thereby reduce the noise generated. The example damper assemblies 28 increasingly resist movement of the plate 26 as the distance between the plate 26 and housing 23 decreases. The increased resistance to movement of the plate 26 provides a reduction in impact force that reduces noise.

Figure 4:
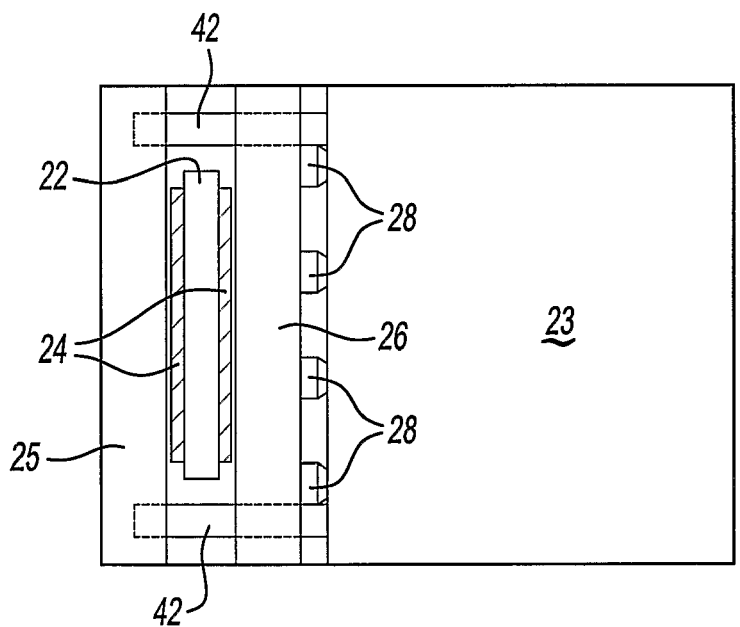
FIG. 4 is an end view of the embodiment of FIG. 2.
Figure 5:
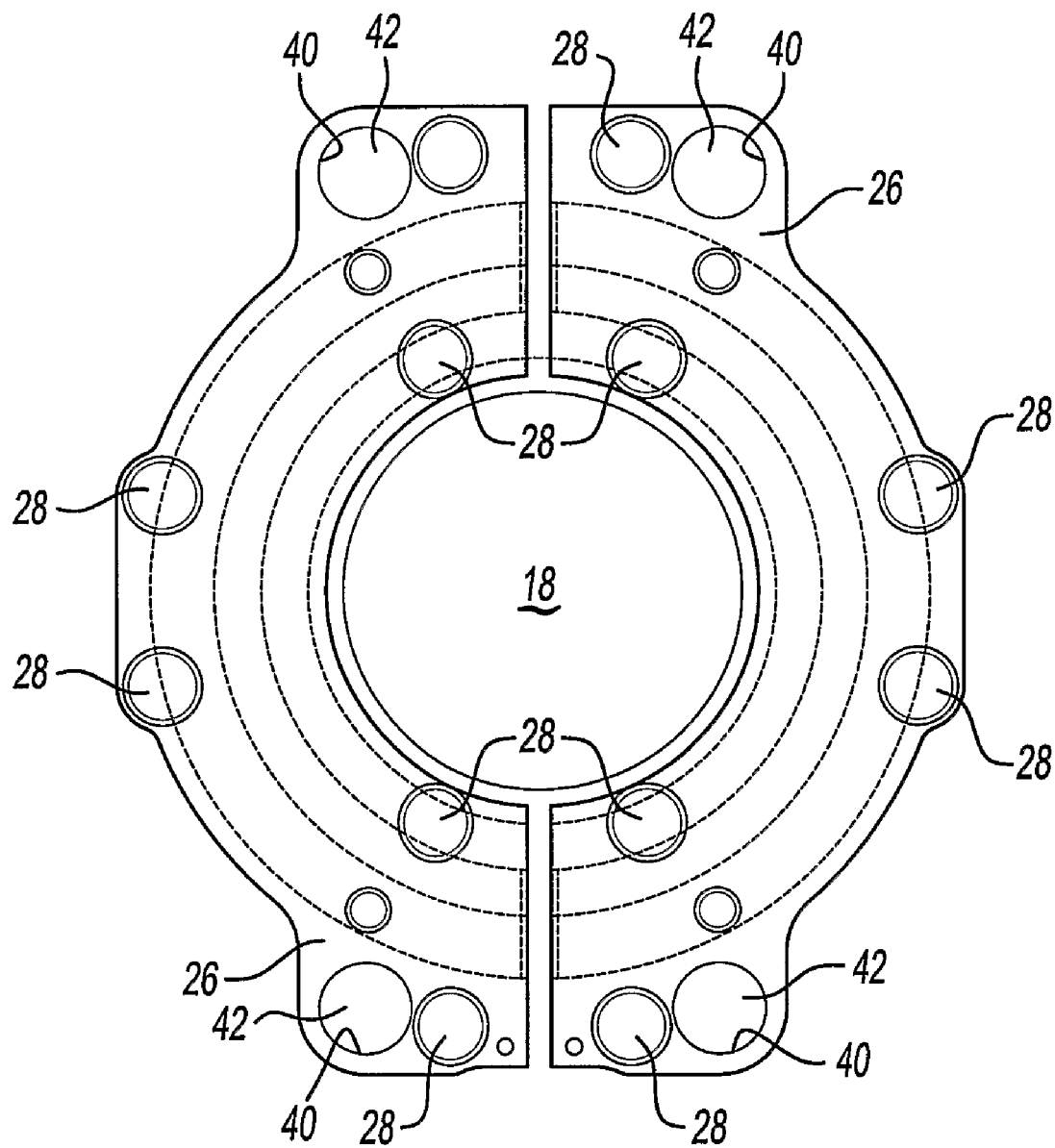
FIG. 5 is a plan view of a plate used in the embodiment of FIG. 4.

Referring to FIGS. 4 and 5, the example brake assembly 16 preferably includes two plates 26, one on each side of the shaft 18. Each of the example plates 26 includes at least three and up to twelve damper assemblies 28. Each plate 26 includes a guide opening 40 through which a guide rod 42 extends. The damper assemblies 28 are disposed in positions relative to the guide openings 40 to maintain the plate 26 parallel to the disk 22 during axial movement toward the housing 23. A worker with the benefit of this disclosure would understand that the specific location and number of damper assemblies are application specific and any number and position of damper assemblies 28 are within the contemplation of this invention.

Although a preferred embodiment of this invention has been disclosed, a worker of ordinary skill in this art would recognize that certain modifications would come within the scope of this invention. For that reason, the following claims should be studied to determine the true scope and content of this invention.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

The invention claimed is:

1. An elevator brake assembly comprising:
   a plate movable between an engaged position and a disengaged position;
   a biasing member biasing said plate toward said engaged position;
   an actuator for moving said plate from said engaged position toward said disengaged position, and
   a damper assembly disposed at least partially within said plate, said damper assembly comprising at least one metal spring biasing a plunger into engagement with the actuator for controlling movement of said plate (26) toward said disengaged position.

2. The assembly as recited in claim 1, wherein the at least one metal spring comprises a Belleville washer.

3. The assembly as recited in claim 2, wherein the at least one metal spring comprises a plurality of Belleville washers.

4. The assembly as recited in claim 1, wherein said actuator comprises a magnetic field generator creating a magnetic force causing movement of said plate.

5. The assembly as recited in claim 1, wherein said actuator includes a housing and said damper assembly controls contact between said plate and said housing.

6. The assembly as recited in claim 1, wherein said plunger is biased by said at least one metal spring to resist movement of said plate (26) toward said disengaged position.

7. The assembly as recited in claim 1, comprising an adjustable member for adjusting a biasing force of said at least one metal spring.

8. The system as recited in claim 1, wherein the metal spring of the damper assembly is distinct from the biasing member.

9. The assembly as recited in claim 1, comprising a plurality of said damper assemblies disposed within said plate.

10. The assembly as recited in claim 9, wherein said plate is movable along a pair of guides and at least one of said plurality of said damper assemblies are disposed on opposite sides of said guides.

11. The assembly as recited in claim 1, comprising a disk, wherein said plate applies a braking force against said disk when in said engaged position.

12. An elevator system comprising:
    an elevator car;
    a motor assembly for moving said elevator car; and
    a braking system comprising a disk driven by said motor assembly, a plate movable between engaged and disengaged positions by an actuator, a biasing member biasing said plate toward said engaged position, and at least one damper assembly disposed at least partially within said plate, said at least one damper assembly having at least one metal spring biasing a plunger into said actuator for controlling movement of said plate toward said disengaged position.

13. The system of claim 12, wherein the at least metal spring comprises a Belleville washer.

14. The system of claim 13, wherein the at least one metal spring comprises a plurality of Belleville washers.

15. The system of claim 12, wherein said actuator comprises a magnetic field generator creating a magnetic force causing movement of said plate.

16. The system as recited in claim 12, wherein the metal spring of the damper assembly is distinct from the biasing member.

17. The system of claim 12, wherein said a plunger is biased against said magnetic field generator.

18. The system of claim 12, comprising a plurality of damper assemblies disposed within said plate.

19. The system of claim 12, comprising an adjustable member for changing a biasing force of said damper assembly.

* * * * *